United States Patent [19]

Hirabayashi et al.

[11] Patent Number: 5,219,592
[45] Date of Patent: Jun. 15, 1993

[54] DOUGH SHEET LAMINATING APPARATUS

[75] Inventors: Koichi Hirabayashi; Yasunori Tashiro, both of Utsunomiya, Japan

[73] Assignee: Rheon Automatic Machinery Co., Ltd., Utsunomiya, Japan

[21] Appl. No.: 741,010

[22] Filed: Aug. 6, 1991

[30] Foreign Application Priority Data

Aug. 10, 1990 [JP] Japan ................................ 2-212138

[51] Int. Cl.$^5$ ............................................. A21C 9/08
[52] U.S. Cl. ................................. 425/383; 264/285;
425/403.1; 426/275; 426/502
[58] Field of Search ............... 426/502, 275; 425/383,
425/403.1, 364 R, 364 B, 323; 264/285;
99/450.1; 493/411, 413; 156/204, 212, 227

[56] References Cited

U.S. PATENT DOCUMENTS

| 1,545,689 | 7/1925 | Peters | 426/502 |
|---|---|---|---|
| 1,975,326 | 10/1934 | Loose et al. | 426/502 |
| 2,482,764 | 9/1949 | Haeberlin | 493/413 |
| 2,619,444 | 11/1952 | Grantham | 156/204 |
| 2,635,322 | 4/1953 | McDermott | 156/204 |
| 3,851,088 | 11/1974 | Albrecht et al. | |
| 3,865,963 | 2/1975 | Gugler | 426/503 |
| 3,953,613 | 4/1976 | Morgenthaler et al. | 426/502 |
| 4,004,035 | 1/1977 | Hirzel et al. | |
| 4,416,910 | 11/1983 | Hayashi et al. | 426/502 |
| 4,734,293 | 3/1988 | Pivonka | 426/502 |
| 4,778,685 | 10/1988 | Simelunas et al. | 426/502 |
| 4,950,355 | 8/1990 | Klose | 156/227 |
| 5,007,623 | 4/1991 | Unkuri et al. | 493/411 |

FOREIGN PATENT DOCUMENTS 467027 6/1937 United Kingdom .
1228049 4/1971 United Kingdom .

Primary Examiner—Jay H. Woo
Assistant Examiner—Joseph S. Leyson
Attorney, Agent, or Firm—Guy W. Shoup; Patrick T. Bever

[57] ABSTRACT

A dough sheet laminating apparatus is provided to fold a dough sheet and feed it to the following line. The apparatus includes a feeding conveyor that supplies a dough sheet, a swinging mechanism located below the feeding conveyor, and a conveying device to feed the laminated dough sheet to the following line. The swinging mechanism includes a plurality of horizontal rollers that are substantially parallel to each other. The adjacent rollers rotate in opposite directions. When the dough sheet is supplied by the feeding device to the swinging mechanism, the dough sheet is supported on each roller and is fed by the rotation of each roller to the conveying device. When the swinging mechanism is swung, the dough sheet is folded on the conveying device.

9 Claims, 6 Drawing Sheets

DOUGH SHEET LAMINATING APPARATUS

BACKGROUND OF THE INVENTION

1. Field of the Invention

This invention relates to an apparatus for making a sheet of food dough of a laminated structure, such as a sheet of puff pastry dough, Danish pastry dough, croissant dough, or the like. This invention particularly relates to a dough laminating apparatus for laminating such a dough sheet when it is manufactured.

2. Prior Art

A prior art laminating apparatus of this kind is disclosed in FIG. 6. It shows swinging vertical plates 61 and 62 that are located between an upper conveyor 60 and an underlying conveyor belt 11. When a dough sheet 1 is supplied from the conveyor 60 to the conveyor belt 11 through the gap between the plates, the dough sheet is swung by the plates and continuously folded on the underlying conveyor belt 11.

There is a large distance between the upper conveyor and the conveying surface of the underlying conveyor belt. The plates do not hold the dough sheet. As a result, the dough sheet hanging between the plates 61 and 62 tends to be extended by its own weight while passing through the gap between the plates. This results in a change in the thickness and/or the width of the dough, and inevitably leads to an increase or decrease in the amount of the supplied dough sheet. As a consequence, a random variation occurs in the weight per unit area of the dough sheet to be folded. When the dough sheet is folded, a laminated dough block having a uniform thickness and width thus cannot be obtained.

SUMMARY OF THE INVENTION

To solve the prior art problems stated above, that is, to avoid such a random variation in the weight of a dough sheet due to gravitation, and due to the inertia caused by the swinging motion of the dough sheet, this invention attempts to minimize the influence caused by the distance along which the dough sheet passes between the swinging plates.

This invention thus provides a dough laminating apparatus comprising a feeding conveyor, a conveying device, and a swinging device, located between the conveying device and the feeding conveyor, that folds a dough sheet, which is supplied by the feeding conveyor to the conveying device, by imparting a swinging motion to it. The swinging device includes a plurality of parallel rollers. When the dough sheet is fed down by the rotation of the rollers, it is supported by them.

Thus, the free gravitational feed of the dough can be sufficiently suppressed, so that the weight per unit area of the dough sheet, when folded, can be made uniform.

Thus, an object of this invention is to provide a dough laminating apparatus for laminating a dough sheet that prevents the dough sheet from being extended due to its own weight before it is folded.

Another object of this invention is to provide a dough laminating apparatus for laminating a dough sheet that has a uniform weight per unit area.

DESCRIPTION OF THE PREFERRED EMBODIMENT

Figure 1:
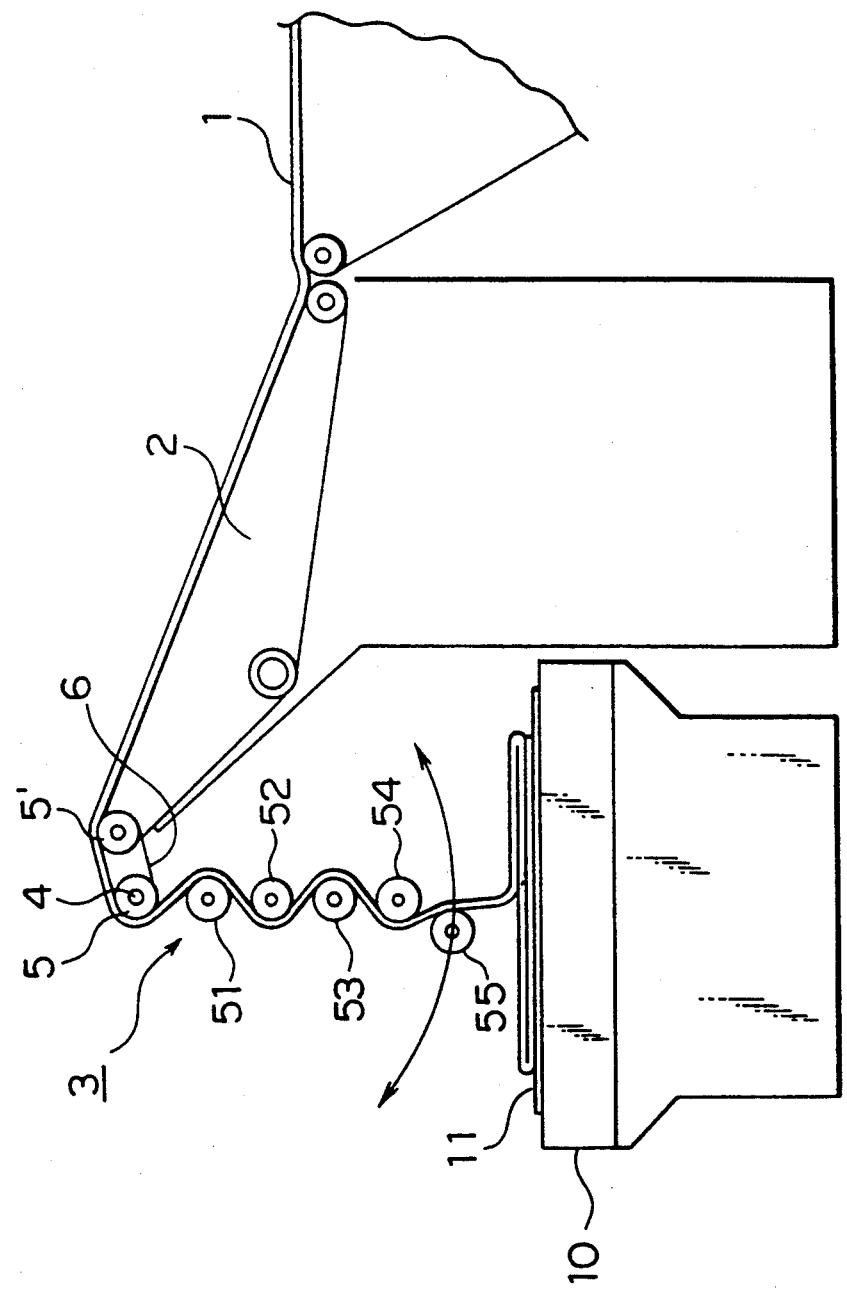
FIG. 1 is a schematic side view of an embodiment of this invention.

The embodiments of this invention will now be explained by referring to the drawings.

FIG. 1 shows a feed conveyor 2, and a swinging mechanism 3 that is connected to the end of it. A conveying device 10, which has a conveyor belt 11, is located under the swinging mechanism 3. The conveyor belt 11 feeds a dough sheet perpendicularly in the feed direction of the feed conveyor 2. A dough sheet 1 is fed by the feed conveyor 2 to the swinging mechanism 3, and is folded on the conveyor belt 11 by the swinging motion of the swinging mechanism 3. The folded dough sheet is then fed to the following line.

The feed conveyor 2 has rollers 5 and 5' at its downstream end. A drive belt 6 is wound about them. The swinging mechanism 3 includes a pivot shaft 4 that is used as the center of the swinging motion of the swinging mechanism 3. The roller 5 is loosely mounted on the pivot shaft 4. The drive belt 6 drives the roller 5 in the feeding direction so that it can rotate at the same speed as the conveying speed of the feed conveyor 2. The pivot shaft 4 is driven by a motor 12 (see FIG. 4) to swing the swinging mechanism 3.

Figure 2:
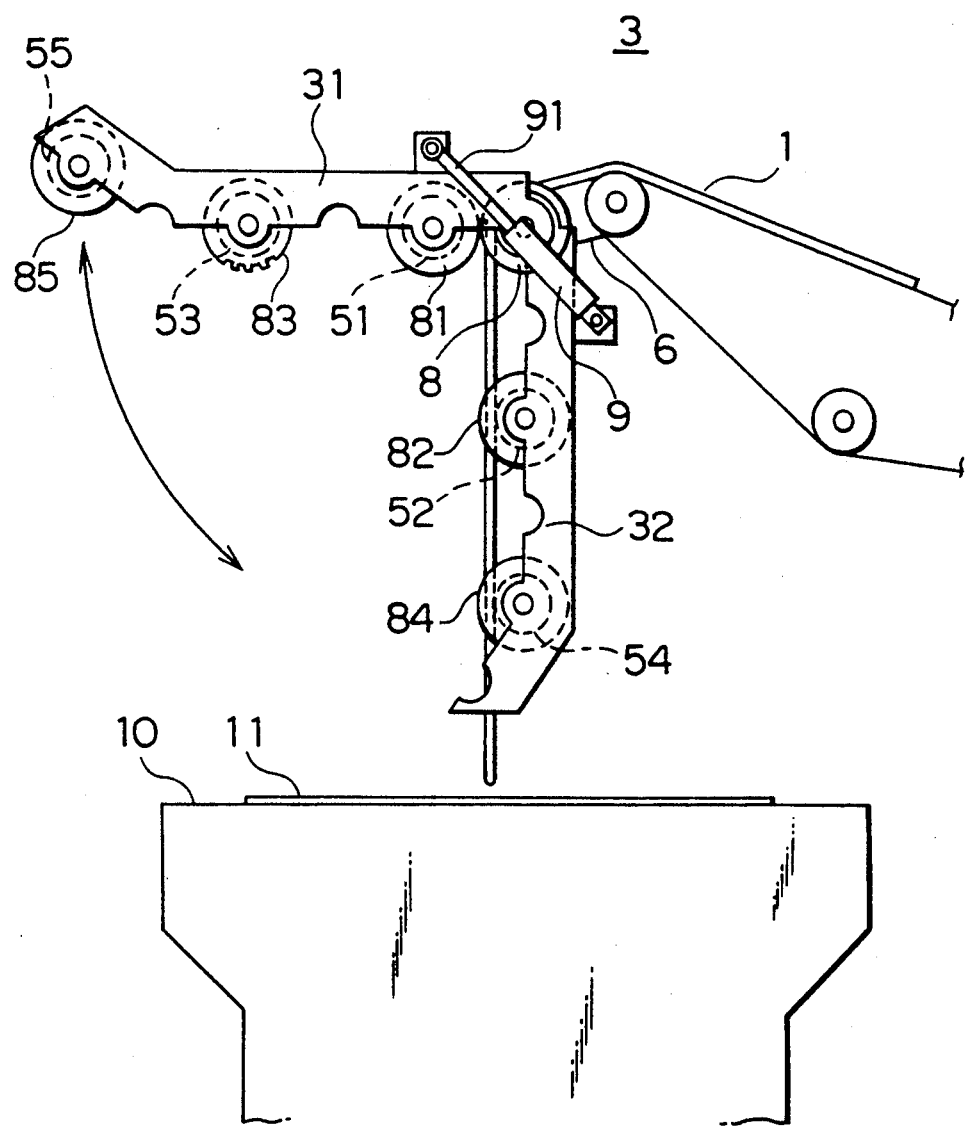
FIG. 2 is a side view of the swinging mechanism of the embodiment of this invention.
Figure 3:
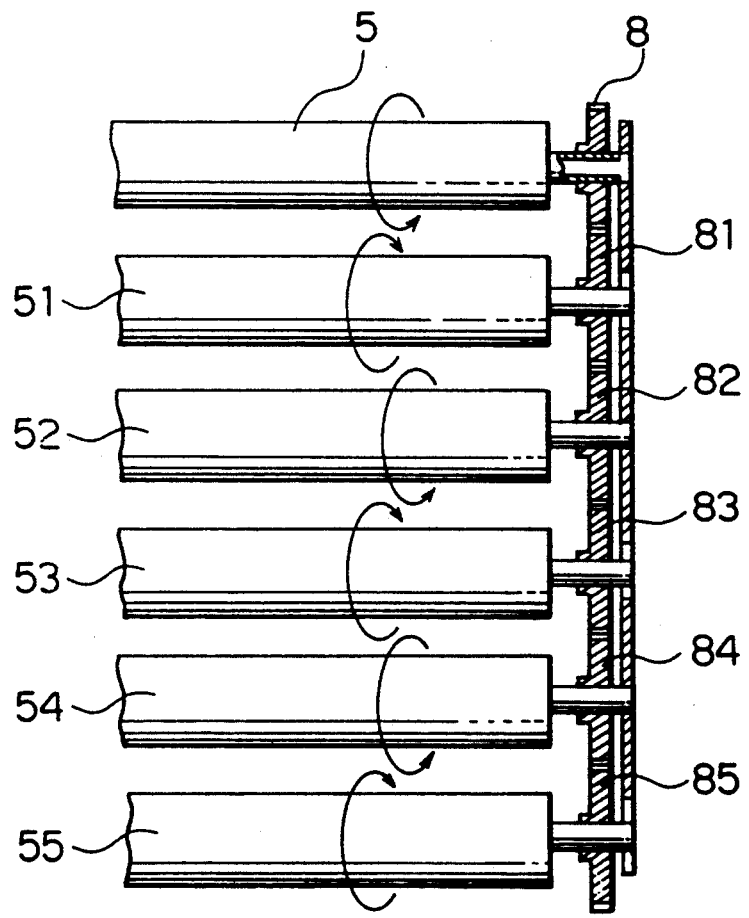
FIG. 3 is a partially and sectional front view of the swinging mechanism of the embodiment of this invention.

FIGS. 2 and 3 show the swinging mechanism 3. It comprises a movable or pivotal arm 31 and a base arm 32. An air cylinder unit 9 is connected between the movable arm 31 and the base arm 32. The movable arm 31 is actuated by the advance of a cylinder rod 91 of the air cylinder unit 9 to move apart from the base arm 32. When the cylinder rod 91 retracts, the movable arm 31 moves to abut the base arm 32.

The movable arm 31 has a plurality of rollers 51, 53, and 55 that are spaced apart from each other by a predetermined distance. The base arm 32 has a plurality of rollers 52 and 54 that are spaced apart from each other by a predetermined distance. When the arm 31 moves to abut the base arm 32, as shown in FIG. 3, each of the rollers 51, 53, and 55 is alternately positioned in relation to each of the rollers 52 and 54 of the base arm 32. A gear 8 is connected to the end of the shaft of the roller 5. Gears 81-85 are respectively connected to the ends of the shafts of the rollers 51-55. When the movable arm 31 is urged to abut the base arm 32, the gear 8 and the gears 81-85 mesh with the adjacent gears. If the roller 5 rotates, the effect of its rotation is transmitted to the gears 81-85 by the gear 8, so that the adjacent gears rotate in opposite directions. That is, when the roller 5 rotates counterclockwise, the roller 51 rotates clockwise, the roller 52 rotates counterclockwise, the roller 53 rotates clockwise, the roller 54 rotates counterclockwise, and the roller 55 then rotates clockwise.

When the movable arm 31 is urged to abut the base arm 32 after the dough sheet 1 is fed from the drive belt 6 between the movable arm 31 and the base arm 32, as shown in FIG. 1, the dough sheet 1 is alternately held by each of the rollers 81-85. Then, when the drive belt 6 rotates to feed the dough sheet, each of the rollers 81-85 is urged to rotate and to feed the dough sheet onto the conveyor belt 11.

Figure 4:
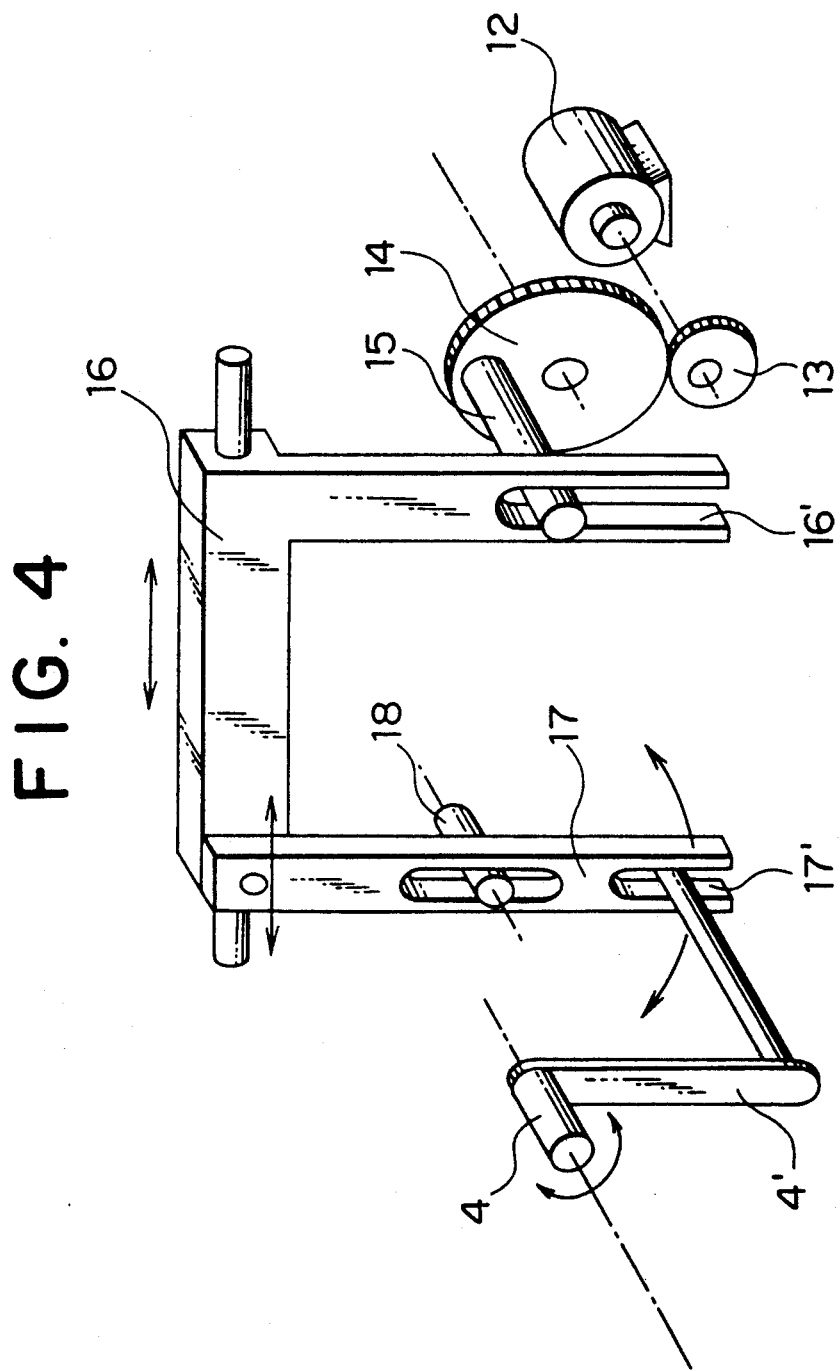
FIG. 4 shows a schematic view of the system for driving the swinging mechanism of the embodiment of this invention.

FIG. 4 shows a drive unit for swinging the swinging mechanism 3. It includes an inverse L-shaped slider 16. An arm 17 is pivoted at an end of the slider 16, and is made to swing by the combined action of the sliding movement of the slider 16 and a fixed pin 18. A groove 17' is provided at the free end of the arm 17. An end of a crank lever 4', which is connected to the shaft 4, is inserted in the groove 17'. A groove 16' is provided at the free end of the slider 16. A rod 15 is fixed on the longest diameter of a large non-circular gear 14 and is near its circumference. The rod is inserted in the groove 16'. A small non-circular gear 13 meshes with the large non-circular gear 14. The small non-circular gear 13 is connected to the shaft of the motor 12.

The reason why the gear 14 is non-circular is that the swinging motion of the swinging mechanism 3 must be accelerated when it swings toward the sides of the conveying device 10 from its center. If the swinging motion of the swinging mechanism is constant, namely, if the angular velocity of the swinging mechanism 3 is constant, the velocity of the free end of the swinging mechanism 3 in a horizontal direction becomes small as the swinging mechanism nears the end of each stroke of the swinging motion, because the swinging mechanism 3 makes a circular motion. As a result, when the swinging mechanism 3 moves apart from the center of the conveying device 10, the volume of the dough sheet per unit length that is supplied to the conveying surface of the conveying device 10 increases. That is, the dough tends to be slack around the folded parts of the dough sheet on the conveying device 10. The dough sheet 1 may not be satisfactorily folded due to this. Thus, the non-circular gear 14 is used to accelerate the swinging motion of the swinging mechanism 3 when it swings outward.

When the small non-circular gear 13 is rotated by the motor 12, the large non-circular gear 14 is rotated by the small non-circular gear 13. When the large non-circular gear 14 rotates, the rod 15, fixed to the gear 14, causes a reciprocatory sliding movement of the slider 16, and the swinging movement of the arm 17 due to the movement of the slider 16 relative to the pin 18. The swinging movement of the arm 17 causes the swinging movement of the crank lever 4' and the rotation of the shaft 4. The swinging mechanism 3 is then swung by the shaft 4. Because the gear 14 is non-circular, the sliding movement of the slider 16 is accelerated when the slider 16 moves near the outward end of each stroke. As a result, the crank lever 4' is swung quickly when the movement of the slider 16 is accelerated. By driving the crank lever 4' in the manner explained above, the swinging motion of the swinging mechanism 3 can be accelerated at the end of each stroke.

In operation, when the dough sheet 1 is fed by the feed conveyor 2 into the swinging mechanism 3, the movable arm 31 is in a position where it is away from the base arm 32, as shown in FIG. 2. Under this condition the dough sheet 1 is fed downward from the upper surface of the roller 5 between the arms 31 and 32. When the arm 31 moves to abut the arm 32, the dough sheet 1 is alternately held by each of the rollers 51-55, as shown in FIG. 1. Because the gears 8 and 81-85 mesh with each other, when the gear 8 rotates with the roller 5, the adjacent gears 81-85 rotate in opposite directions, so that the dough sheet 1 is fed by each of the rollers 51-55 to the conveyor belt 11.

Then, when the swinging mechanism 3 starts its swinging motion, which is caused by the motor 12, the dough sheet 1 is fed out from the lowest roller 55, and it is immediately placed and folded on the conveyor belt 11. Therefore, unlike the prior art swinging mechanism, the dough sheet 1 will not be extended by its own weight, and its thickness will not be changed. Then the dough sheet is fed by the conveying belt 11 as it is folded on the following line.

Figure 5:
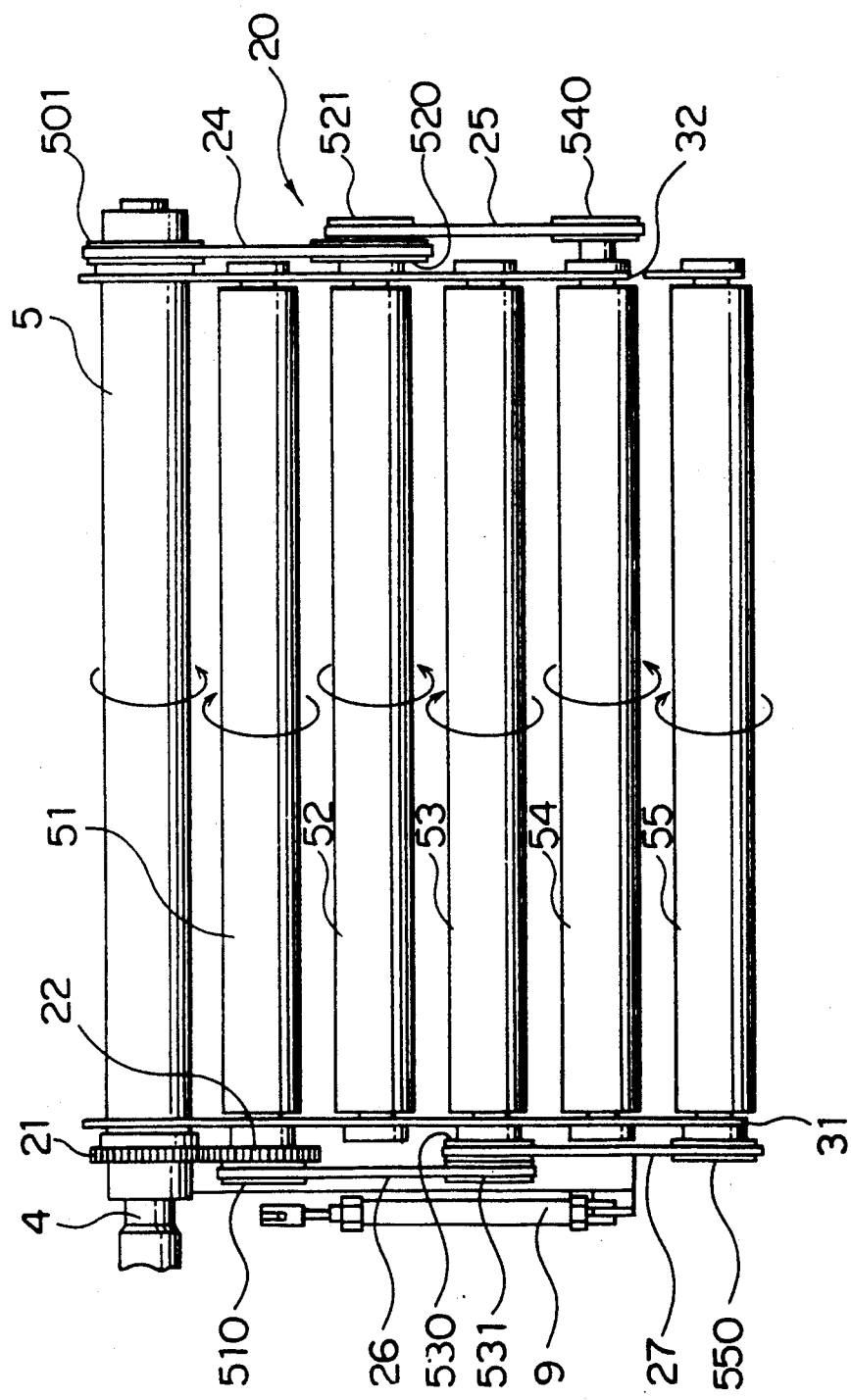
FIG. 5 is a front view of another embodiment of the swinging mechanism of this invention.
Figure 6:
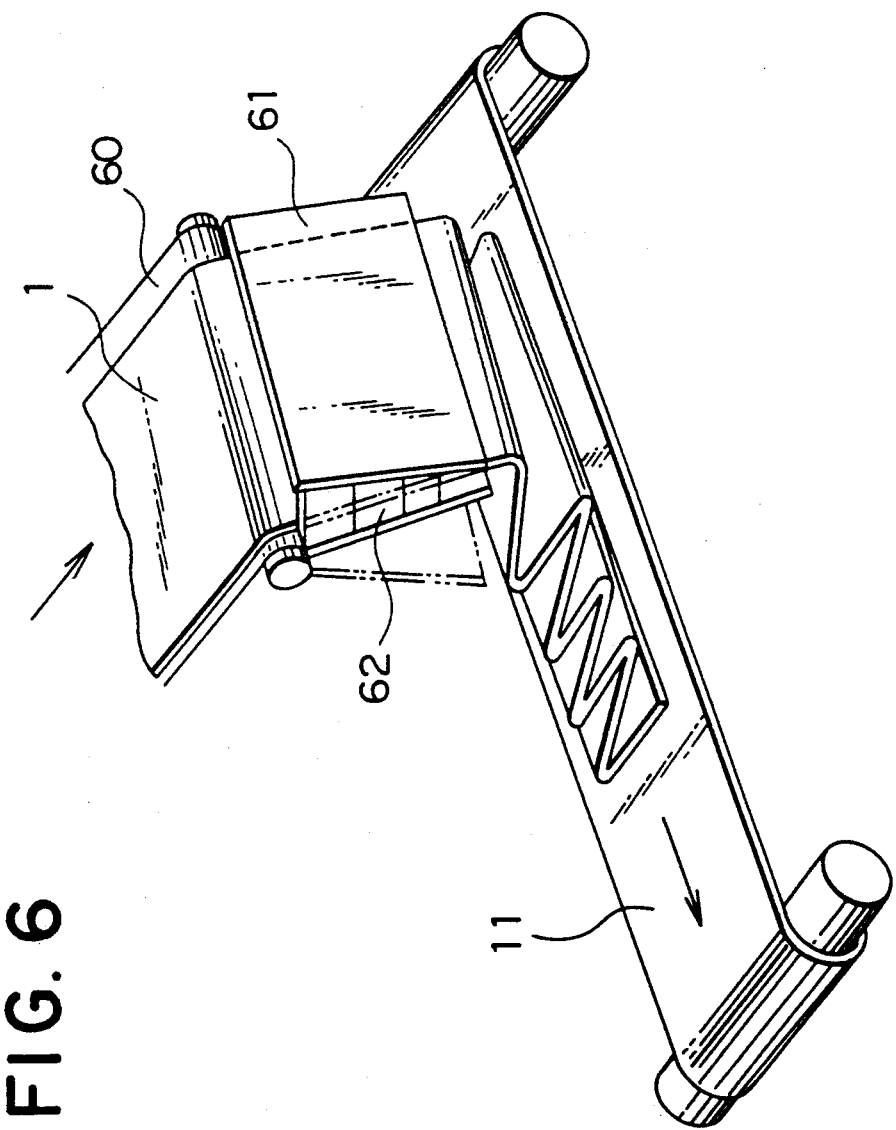
FIG. 6 is a perspective view of a prior art apparatus.

FIG. 5 shows a swinging mechanism 20 of another embodiment of this invention. The reference numbers indicated for the elements of the first embodiment of this invention are used for the same elements. Pulleys 501 and 520 are fixed to the shafts of the rollers 5 and 52, respectively. A belt 24 is set between the pulleys 501 and 520. A pulley 521 is also mounted to the shaft of the roller 52. A pulley 540 is mounted on the shaft of the roller 54. A belt 25 is set between the pulleys 521 and 540. When the roller 5 rotates, the effect of its rotation is transmitted to both the rollers 52 and 54 through the belts 24 and 25 respectively.

Similarly, pulleys 510 and 531 are mounted on the shafts of the rollers 51 and 53, respectively. A belt 26 is set between the pulleys 510 and 531. A pulley 530 is also mounted on the shaft of the roller 53. A pulley 550 is mounted on the shaft of the roller 55. A belt 27 is set between the pulleys 530 and 550. A gear 21 is fixed to the shaft of the roller 5. A gear 22 is fixed to the shaft of the roller 51. When the movable arm 31 moves to abut the base arm 32, they mesh. When the roller 5 rotates, the roller 51 rotates through the gears 21 and 22. After the arm 31 is moved by the air cylinder 29 to abut the arm 32, the effect of the rotation of the roller 51 is transmitted to both of the rollers 53 and 55 through the belts 26 and 27, respectively.

In operation, the dough sheet 1 is fed between the arms 31 and 32. When the arms 31 and 32 are closed, the dough sheet is supported by all of the rollers 51-55. When the roller 5 rotates, the effect of its rotation is transmitted to each of the rollers 51 and 52 through the gear 22 or the belt 24. The roller 51 thus rotates in a direction opposite to that of the roller 5, while the roller 52 rotates in the same direction as that of the roller 5. The rotation of the roller 51 causes the rollers 53 and 55 to rotate in the same direction. The rotation of the roller 52 causes the roller 54 to rotate in the same direction. As a result, the adjacent rollers 5 and 51-55 rotate in opposite directions. The dough sheet is then fed by the rollers to the conveyor belt 11 and is folded on it.

It will be understood from the foregoing explanations that rollers can be provided in a swinging mechanism to support a dough sheet on each roller when it is fed. Therefore, no extension caused by its own weight occurs in the dough sheet, although a vertical distance is required to fold the dough sheet by a swinging motion. Therefore, a continuous dough sheet having a uniform thickness and width can be fed on a conveying device.

Also, because the angular velocity of the swinging mechanism can be changed or regulated at the necessary position, no variation in the thickness occurs in the dough sheet due to the arcuate motion of the swinging mechanism.

Thus, a laminated web of dough having a uniform size can be supplied to a following line.

We claim:

1. A dough sheet laminating apparatus comprising a feeding conveyor that supplies a dough sheet, a swinging device located below the feeding conveyor for feeding the dough sheet and folding by a swinging motion the dough sheet that is supplied by the feeding conveyor, and a conveying device on which the dough sheet is folded and is fed to the following line, whereby the swinging device includes a plurality of horizontal rollers having axes that are substantially parallel to each other, whereby each of the plurality of rollers rotates in a direction opposite to an adjacent one of the plurality of rollers, and whereby the dough sheet is supported on each of the plurality of rollers and is fed by the rotation of the plurality of rollers.

2. The dough sheet laminating apparatus of claim 1, wherein the swinging device comprises a movable arm separably connected to a base arm, the plurality of horizontal rollers being located on these arms such that when the movable arm and base arm are closed, at least one roller located on the movable arm is disposed between two rollers disposed on the base arm, each of the plurality of horizontal rollers having a gear disposed at one end such that the gear of each of the plurality of rollers meshes with the gear of an adjacent one of the plurality of rollers when the arms are closed.

3. The dough sheet laminating apparatus of claim 1, wherein the swinging device comprises a movable arm and a base arm, the plurality of horizontal rollers being alternately located on these arms, each adjacent pair of rollers on each arm being connected by an endless belt wound about them so as to be rotated in the same direction.

4. The dough sheet laminating apparatus of claim 1, wherein the swinging device includes a drive unit to swing said device, the drive unit having a slider, a gear on which a rod is fixed to move the slider, and a motor rotating the gear, whereby when the motor rotates, the rod is rotationally moved by the gear, the rotational movement of the rod causing the slider to reciprocate and thus to swing the swinging device.

5. The dough sheet laminating apparatus of claim 4, wherein the gear is non-circular so as to change the velocity of parts of each stroke of the reciprocating motion of the slider, so that the swinging motion of the swinging mechanism can be accelerated when it swings toward the outside end of each stroke.

6. A dough sheet laminating apparatus for folding a dough sheet supplied from a feeding conveyor onto a conveying device, the apparatus comprising:

a frame having a first end and a second end, the first end being disposed adjacent the feeding conveyor, the second end being disposed adjacent the conveying device;

a first roller disposed on the frame adjacent the first end;

a second roller disposed on the frame adjacent the second end; and a plurality of rollers disposed between the first and second rollers, a portion of each of the plurality of rollers being disposed in a plane, each of the plurality of rollers having an axis, the axes of the plurality of rollers being parallel;

wherein each of the plurality of rollers rotates in a direction opposite to an adjacent one of the plurality of rollers.

7. An apparatus of claim 6 wherein the frame further comprises a movable portion and a base portion, the movable portion being separable from the base portion, and the plurality of rollers includes a first group of rollers disposed on the movable portion and a second group of rollers disposed on the base portion, and wherein when the movable portion is operably connected to the base, each roller of the first group is disposed adjacent at least one roller of the second group.

8. An apparatus of claim 7 further comprising a gear disposed on each of the first and second rollers and the plurality of rollers such that when the movable portion is operably connected to the base portion, the gear of each roller meshes with at least one gear of an adjacent roller.

9. An apparatus of claim 7 further comprising a pulley disposed on each of the first and second rollers and the plurality of rollers, and wherein the pulleys of two of rollers of the first group are connected by a belt, and wherein the pulleys of two of the rollers of the second group are connected by a belt.

* * * * *